(12) United States Patent
Meng et al.

(10) Patent No.: US 11,724,674 B2
(45) Date of Patent: Aug. 15, 2023

(54) METHOD, DEVICE AND SYSTEM FOR AUTOMATICALLY BRAKING COMMERCIAL VEHICLE

(71) Applicant: Beijing Smarter Eye Technology Co. Ltd., Beijing (CN)

(72) Inventors: Ran Meng, Beijing (CN); Hua Chai, Beijing (CN); Zhe Wang, Beijing (CN); Yong Jia, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 36 days.

(21) Appl. No.: 17/400,557

(22) Filed: Aug. 12, 2021

(65) Prior Publication Data
US 2023/0001892 A1    Jan. 5, 2023

(30) Foreign Application Priority Data

Jul. 2, 2021   (CN) .......................... 202110753215.0

(51) Int. Cl.
*B60T 7/22*    (2006.01)
*B60T 8/171*   (2006.01)

(52) U.S. Cl.
CPC ............... *B60T 7/22* (2013.01); *B60T 8/171* (2013.01); *B60T 2201/022* (2013.01); *B60T 2220/00* (2013.01); *B60T 2250/00* (2013.01); *B60T 2250/04* (2013.01)

(58) Field of Classification Search
CPC ...... B60T 7/22; B60T 8/171; B60T 2201/022; B60T 2220/00; B60T 2250/00; B60T 2250/04; B60T 8/172; B60T 8/58; B60T 2201/03; B60T 2210/32; B60T 2220/04
See application file for complete search history.

(56) References Cited

U.S. PATENT DOCUMENTS

| | | | | |
|---|---|---|---|---|
| 2004/0090117 | A1* | 5/2004 | Dudeck | B60W 30/0956 303/193 |
| 2005/0090955 | A1* | 4/2005 | Engelman | G06V 20/58 180/271 |
| 2009/0254260 | A1* | 10/2009 | Nix | G01S 15/10 348/148 |

* cited by examiner

*Primary Examiner* — Andrew J Cromer
(74) *Attorney, Agent, or Firm* — NKL Law; Allen Xue (57) ABSTRACT

A method for automatically braking a commercial vehicle includes: providing a plurality of ultrasonic radars on a front vehicle body of a target commercial vehicle, the ultrasonic radars being configured to detect a region before the target commercial vehicle in a gapless manner, an active speed range being set for each ultrasonic radar; acquiring a current speed of the target commercial vehicle in real time and calculating a safe distance for each ultrasonic radar in accordance with the current speed; and detecting whether there is an obstacle within the safe distance in real time, and when there is the obstacle within the safe distance, transmitting a decelerating or braking instruction to an execution system of the target commercial vehicle.

4 Claims, 8 Drawing Sheets

--- providing a plurality of ultrasonic radars on a front vehicle body of a target commercial vehicle, the ultrasonic radars being configured to detect a region before the target commercial vehicle in a gapless manner, an active speed range being set for each ultrasonic radar — S101 acquiring a current speed of the target commercial vehicle in real time and calculating a safe distance for each ultrasonic radar in accordance with the current speed — S103 detecting whether there is an obstacle within the safe distance in real time, and when there is the obstacle within the safe distance, transmitting a decelerating or braking instruction to an execution system of the target commercial vehicle — S105

```
┌─────────────────────────────────────────────────────────┐
│  providing a plurality of ultrasonic radars on a front  │  S101
│ vehicle body of a target commercial vehicle, the        │
│ ultrasonic radars being configured to detect a region   │
│ before the target commercial vehicle in a gapless       │
│  manner, an active speed range being set for each       │
│                   ultrasonic radar                       │
└─────────────────────────────────────────────────────────┘
                            │
                            ▼
┌─────────────────────────────────────────────────────────┐
│     acquiring a current speed of the target             │  S103
│         commercial vehicle in real time                 │
│    and calculating a safe distance for each             │
│    ultrasonic radar in accordance with the current speed │
└─────────────────────────────────────────────────────────┘
                            │
                            ▼
┌─────────────────────────────────────────────────────────┐
│  detecting whether there is an obstacle within the      │  S105
│  safe distance in real time, and when there is the      │
│  obstacle within the safe distance, transmitting a      │
│  decelerating or braking instruction to an execution    │
│         system of the target commercial vehicle         │
└─────────────────────────────────────────────────────────┘
```

METHOD, DEVICE AND SYSTEM FOR AUTOMATICALLY BRAKING COMMERCIAL VEHICLE

TECHNICAL FIELD

The present disclosure relates to the field of safe driving technology, in particular to a method, a device and a system for automatically braking a commercial vehicle.

BACKGROUND

Figure 2:
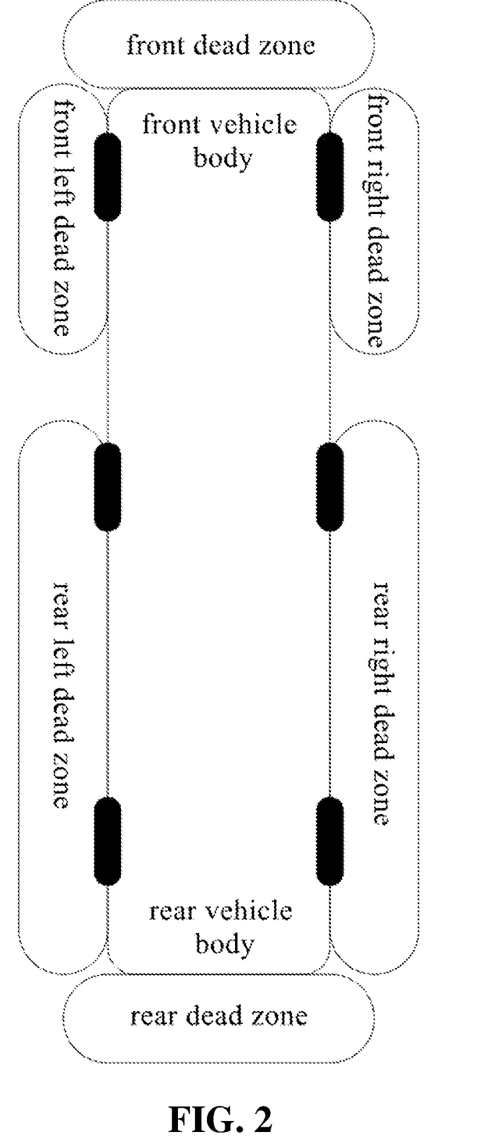
FIG. 2 is a schematic view showing dead zones for a driver in the related art.

Recently, along with the rapid development of Artificial Intelligence (AI) technology as well as the concern about traffic safety, the Ministry of Communications has proposed related standards about an Autonomous Emergency Braking System (AEBS) of a vehicle involving active safety. As compared with passenger vehicles, a commercial vehicle has a long vehicle body and a large chassis height, so there are dead zones surrounding the commercial vehicle for a driver (as shown in FIG. 2), and thereby traffic safety issues easily occur. Traffic accidents caused by the dead zones account for a large proportion in all traffic accidents. Hence, there is an urgent need to provide a scheme to solve the traffic safety issues for the commercial vehicle.

SUMMARY

A main object of the present disclosure is to provide a method, a device and a system for automatically braking a commercial vehicle, so as to solve the traffic safety issues for the commercial vehicle.

In one aspect, the present disclosure provides in some embodiments a method for automatically braking a commercial vehicle, including: providing a plurality of ultrasonic radars on a front vehicle body of a target commercial vehicle, the ultrasonic radars being configured to detect a region before the target commercial vehicle in a gapless manner, an active speed range being set for each ultrasonic radar; acquiring a current speed of the target commercial vehicle in real time and calculating a safe distance for each ultrasonic radar in accordance with the current speed; and detecting whether there is an obstacle within the safe distance in real time, and when there is the obstacle within the safe distance, transmitting a decelerating or braking instruction to an execution system of the target commercial vehicle.

In a possible embodiment of the present disclosure, the acquiring the current speed of the target commercial vehicle in real time and calculating the safe distance for each ultrasonic radar in accordance with the current speed includes: defining an angle between a line connecting an origin and an $n^{th}$ ultrasonic radar and a driving direction as $\alpha_n$; judging whether $|\alpha_n|$ is smaller than or equal to 90°, and when $|\alpha_n|$ is smaller than or equal to 90°, calculating the safe distance in real time through $S_n = V \times \cos(|\alpha_n|) \times P_1 + P_2$ (1); and when $|\alpha_n| > 90°$, determining that the safe distance $S_n$ is 0, where $S_n$ represents a dynamic safe distance for the $n^{th}$ ultrasonic radar, n represents a serial number of the ultrasonic radar, V represents a current speed, $P_1$ and $P_2$ are constants.

In a possible embodiment of the present disclosure, the method further includes: providing a plurality of ultrasonic radars at both sides of a rear vehicle body of the target commercial vehicle, the ultrasonic radars being configured to detect regions at both sides of the rear vehicle body of the target commercial vehicle in a gapless manner, a first active speed threshold being set for each ultrasonic radar; acquiring a steering angle of a steering wheel of the target commercial vehicle in real time, and when the steering wheel turns to left or right by 90°, determining that the commercial vehicle is turning to the left or right; and activating the ultrasonic radars at a corresponding side to detect whether there is an obstacle within the safe distance, and when there is the obstacle within the safe distance, transmitting the decelerating or braking instruction to the execution system of the target commercial vehicle.

In a possible embodiment of the present disclosure, the method further includes: providing a plurality of ultrasonic radars at a rear side of the target commercial vehicle, the ultrasonic radars being configured to detect a region behind the target commercial vehicle in a gapless manner; acquiring information about a gear position of the target commercial vehicle in real time, acquiring a speed of the target commercial vehicle in real time when the target commercial vehicle is reversing, and transmitting the decelerating or braking instruction to the execution system of the target commercial vehicle when the speed is greater than a predetermined speed; and detecting whether there is an obstacle at a rear dead zone within the safe distance, and when there is the obstacle within the safe distance, transmitting the decelerating or braking instruction to the execution system of the target commercial vehicle.

In a possible embodiment of the present disclosure, the method further includes providing a binocular stereo camera and a millimeter-wave radar at a front side of the target commercial vehicle, detecting whether there is an obstacle before the target commercial vehicle within a medium or long distance through the binocular stereo camera or the millimeter-wave radar, and when there is the obstacle within the medium or long distance, transmitting the decelerating or braking instruction to the execution system of the target commercial vehicle in accordance with a predetermined braking strategy.

In another aspect, the present disclosure provides in some embodiments a device for automatically braking a commercial vehicle, including: a first pre-installed module including a plurality of ultrasonic radars arranged on a front vehicle body of a target commercial vehicle and configured to detect a region before the target commercial vehicle in a gapless manner, an active speed range being set for each ultrasonic radar; a calculation module configured to acquire a current speed of the target commercial vehicle in real time and calculate a safe distance for each ultrasonic radar in accordance with the current speed; and a detection module configured to detect whether there is an obstacle within the safe distance in real time, and when there is the obstacle within the safe distance, transmit a decelerating or braking instruction to an execution system of the target commercial vehicle.

In a possible embodiment of the present disclosure, the calculation module includes: a definition module configured to define an angle between a line connecting an origin and an $n^{th}$ ultrasonic radar and a driving direction as $\alpha_n$; a judgment module configured to judge whether $|\alpha_n|$ is smaller than or equal to 90°, and when $|\alpha_n|$ is smaller than or equal to 90°, calculate the safe distance in real time through $S_n = V \times \cos(|\alpha_n|) \times P_1 + P_2$ (1); and a first determination module configured to, when $|\alpha_n| > 90°$, determine that the safe distance $S_n$ is 0, where $S_n$ represents a dynamic safe distance for the $n^{th}$ ultrasonic radar, n represents a serial number of the ultrasonic radar, V represents a current speed, $P_1$ and $P_2$ are constants.

In a possible embodiment of the present disclosure, the device further includes: a second pre-installed module including a plurality of ultrasonic radars arranged at both sides of a rear vehicle body of the target commercial vehicle and configured to detect regions at both sides of the rear vehicle body of the target commercial vehicle in a gapless manner, a first active speed threshold being set for each ultrasonic radar; a second determination module configured to acquire a steering angle of a steering wheel of the target commercial vehicle in real time, and when the steering wheel turns to left or right by 90°, determine that the commercial vehicle is turning to the left or right; and a transmission module configured to activate the ultrasonic radars at a corresponding side to detect whether there is an obstacle within the safe distance, and when there is the obstacle within the safe distance, transmit the decelerating or braking instruction to the execution system of the target commercial vehicle.

In a possible embodiment of the present disclosure, the device further includes: a third pre-installed module including a plurality of ultrasonic radars arranged at a rear side of the target commercial vehicle and configured to detect a region behind the target commercial vehicle in a gapless manner; a third determination module configured to acquire information about a gear position of the target commercial vehicle in real time, acquire a speed of the target commercial vehicle in real time when the target commercial vehicle is reversing, and transmit the decelerating or braking instruction to the execution system of the target commercial vehicle when the speed is greater than a predetermined speed; and a fourth determination module configured to detect whether there is an obstacle at a rear dead zone within the safe distance, and when there is the obstacle within the safe distance, transmit the decelerating or braking instruction to the execution system of the target commercial vehicle.

In yet another aspect, the present disclosure provides in some embodiments a system for automatically braking a commercial vehicle, including the above-mentioned device.

According to the embodiments of the present disclosure, the system for automatically braking the commercial vehicle uses an algorithm, and includes the binocular stereo camera, the millimeter-wave radar, the ultrasonic radars, a strategy control system, a braking execution system, a man-machine interaction screen and relevant circuits. When there is the obstacle that probably collides with the vehicle, the system may automatically give an alarm or automatically brake the vehicle, so as to prevent or remarkably reduce the occurrence of traffic accidents caused when a driver is in a fatigue state, dozing, being distracted, or chatting, thereby to improve the driving safety.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
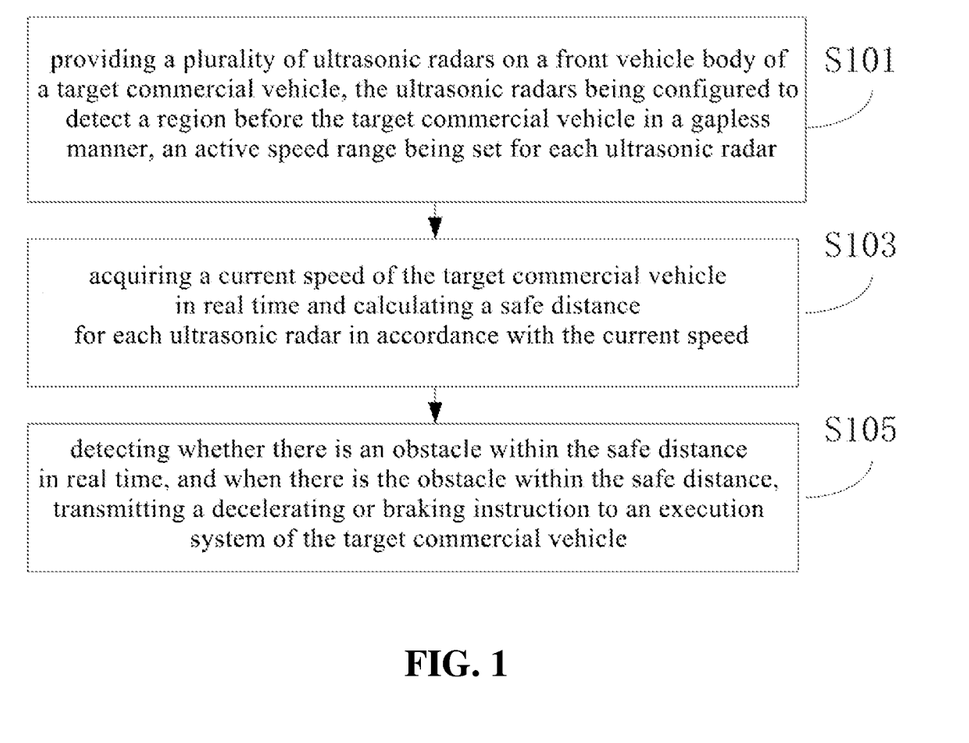
FIG. 1 is a flow chart of a method for automatically braking a commercial vehicle according to one embodiment of the present disclosure.

The present disclosure provides in some embodiments a method for automatically braking a commercial vehicle which, as shown in FIG. 1, includes: S101 of providing a plurality of ultrasonic radars on a front vehicle body of a target commercial vehicle, the ultrasonic radars being configured to detect a region before the target commercial vehicle in a gapless manner, an active speed range being set for each ultrasonic radar; S103 of acquiring a current speed of the target commercial vehicle in real time and calculating a safe distance for each ultrasonic radar in accordance with the current speed; and S105 of detecting whether there is an obstacle within the safe distance in real time, and when there is the obstacle within the safe distance, transmitting a decelerating or braking instruction to an execution system of the target commercial vehicle.

Figure 3:
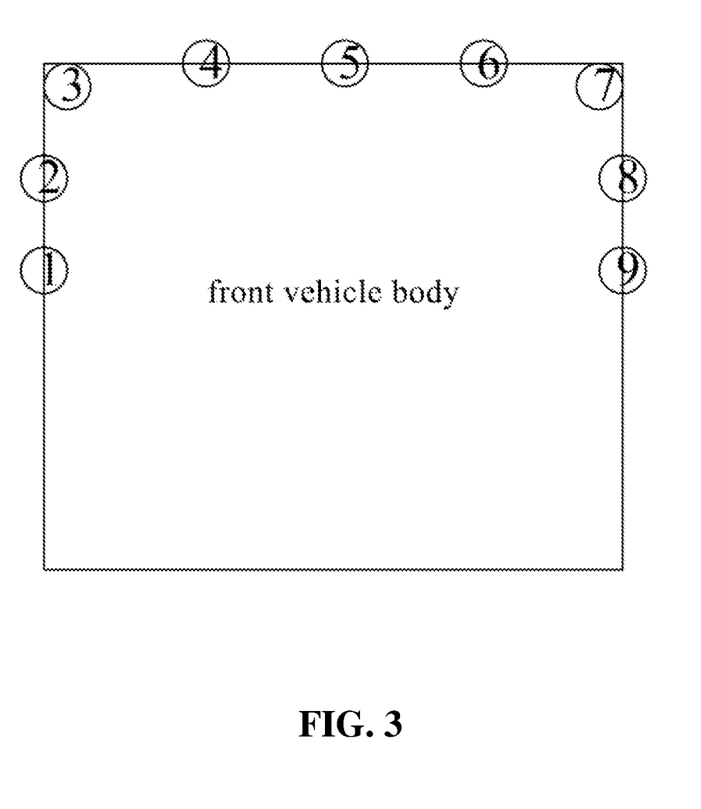
FIG. 3 is a schematic view showing the arrangement of ultrasonic radars on a front vehicle body according to one embodiment of the present disclosure.

To be specific, in S101, the plurality of ultrasonic radars may be arranged at a front left side, a front right side and a front side of a vehicle body. As shown in FIG. 3, first and second ultrasonic radars are arranged at a left side of a vehicle head, eighth and ninth ultrasonic radars are arranged at a right side of the vehicle head, a third ultrasonic radar is arranged at the front left side, a seventh ultrasonic radar is arranged at the front right side, and fourth, fifth and sixth ultrasonic radars are arranged at the front side. The quantity of ultrasonic radars depends on a search angle of each radar and a width of the vehicle body. In a word, the ultrasonic radars may be arranged in such a manner as to detect the region in a gapless manner, and an arrangement mode thereof will not be particularly defined herein. The ultrasonic radars at a front left dead zone, a front right dead zone and a front dead zone may be activated when the speed is smaller than a predetermined value, e.g., 10 km/h to 30 khm. For example, when the speed is smaller than 15 km/h, data acquired by the ultrasonic radars may be adopted by a decision-making module, otherwise, the data may not be adopted by the decision-making module. The active speed range may be set according to the practical need. The accuracy of the ultrasonic radar may be deteriorated in the case of a high speed. It merely makes sense when the obstacle is detected within a short range in such scenarios as a turning, a crossroad, a narrow road or a downtown area, and usually the speed of the vehicle is not too high in these scenarios.

Figure 4:
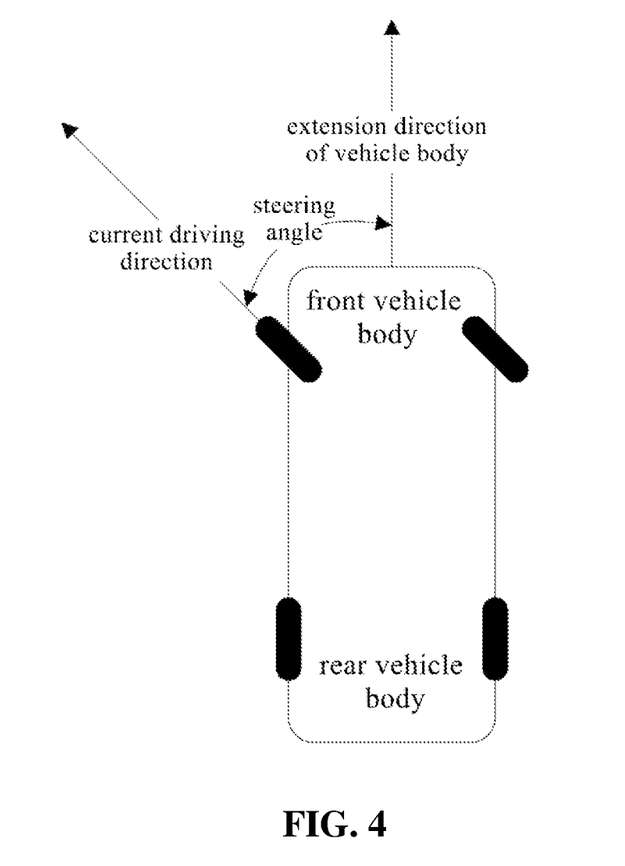
FIG. 4 is a schematic view showing a situation where a vehicle is turning according to one embodiment of the present disclosure.

In S103, the current speed may be acquired in real time, and then the safe distance for each ultrasonic radar may be calculated in accordance with the current speed. To be specific, whether the vehicle turns to left, right or goes straight may be acquired in accordance with a steering angle of a steering wheel, and then an angle between a current driving direction (i.e., a movement direction of a front wheel) and an extension direction of the vehicle body, i.e., a steering angle of the vehicle, may be acquired, as shown in FIG. 4.

Figure 5:
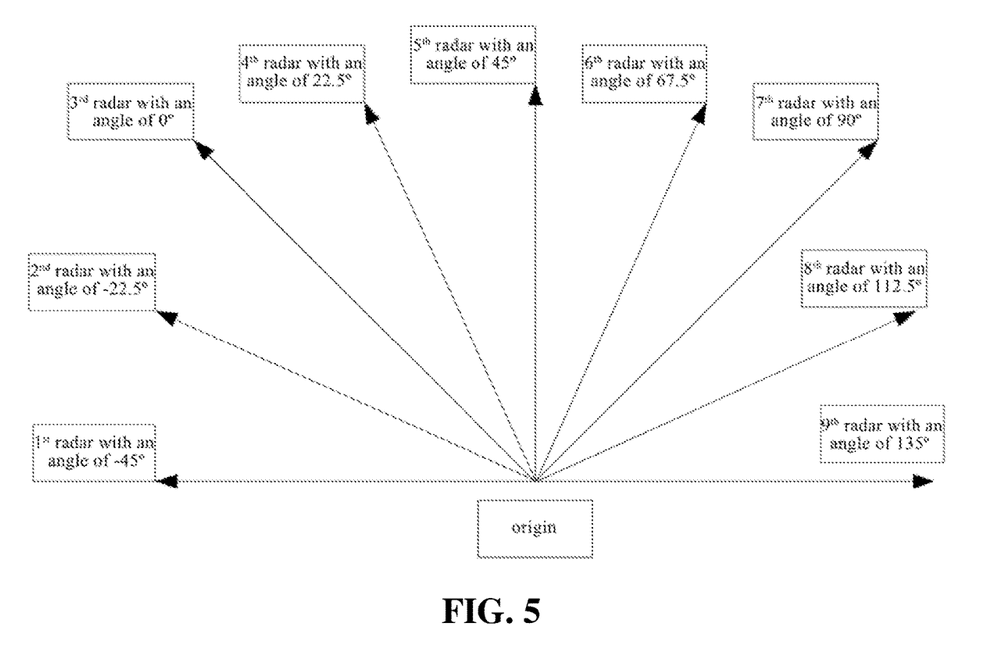
FIG. 5 is a schematic view showing angles between the radars and a current driving direction according to one embodiment of the present disclosure.

As shown in FIG. 5, a line passing through the fifth ultrasonic radar may vertically intersect a line connecting the first and the ninth ultrasonic radar at a point, i.e., an origin of a coordinate system. Then, an angle between a line connecting the origin and each ultrasonic radar and the driving direction may be acquired. For ease of description, the steering angle of the vehicle may be 45°, i.e., the angle between the current driving direction and the extension direction of the vehicle body may be 45°. FIG. 5 shows the angle, i.e., $\alpha_n$, between the line connecting the origin and each ultrasonic radar and the driving direction, where n represents a serial number of each ultrasonic radar.

Through calculating $\alpha_n$, it is able to set different dynamic safe distances for the ultrasonic radars at different positions. The closer to the driving direction, the smaller the value of $\alpha_n$, and the larger the safe distance. The further to the driving direction, the larger the value of $\alpha_n$, and the smaller the safe distance. In S105, when a certain ultrasonic radar has detected that there is the obstacle within a corresponding safe distance, a decision-making system may transmit the decelerating or braking instruction to the execution system. The dynamic safe distance for each ultrasonic radar may be expressed as $S_n = V \times \cos(|\alpha_n|) \times P_1 + P_2$ (1), where $S_n$ represents a dynamic safe distance for the $n^{th}$ ultrasonic radar, V represents a current speed, $\alpha_n$ represents the angle between the line connecting the origin and the ultrasonic radar and the driving direction, and $P_1$ and $P_2$ are constants. When $|\alpha_n| > 90°$, $S_n$ is 0.

Based on the above equation (1), when the speed is larger, the dynamic safe distance for each ultrasonic radar may be larger too, and the speed may be in direct proportion to the dynamic safe distance. When the cosine of an absolute value of the angle $\alpha_n$ is larger, the dynamic safe distance for each ultrasonic radar may be larger too, and the cosine of the absolute value of the angle $\alpha_n$ may be in direct proportion to the dynamic safe distance. $P_2$ may be understood as a minimum value of the dynamic safe distance when $V \times \cos(|\alpha_n|) \times P_1$, e.g., when $|\alpha_n| = 90°$. In other words, the minimum value of the dynamic safe distance for each ultrasonic radar may be $P_2$.

The dynamic safe distance is set so as to reduce a probability of braking the vehicle erroneously to a greatest extent while ensuring the system to transmit the decelerating or braking instruction in time in the case of a danger.

In a possible embodiment of the present disclosure, the method further includes: providing a plurality of ultrasonic radars at both sides of a rear vehicle body of the target commercial vehicle, the ultrasonic radars being configured to detect regions at both sides of the rear vehicle body of the target commercial vehicle in a gapless manner, a first active speed threshold being set for each ultrasonic radar; acquiring a steering angle of a steering wheel of the target commercial vehicle in real time, and when the steering wheel turns to left or right by 90°, determining that the commercial vehicle is turning to the left or right; and activating the ultrasonic radars at a corresponding side to detect whether there is an obstacle within the safe distance, and when there is the obstacle within the safe distance, transmitting the decelerating or braking instruction to the execution system of the target commercial vehicle.

Figure 6:
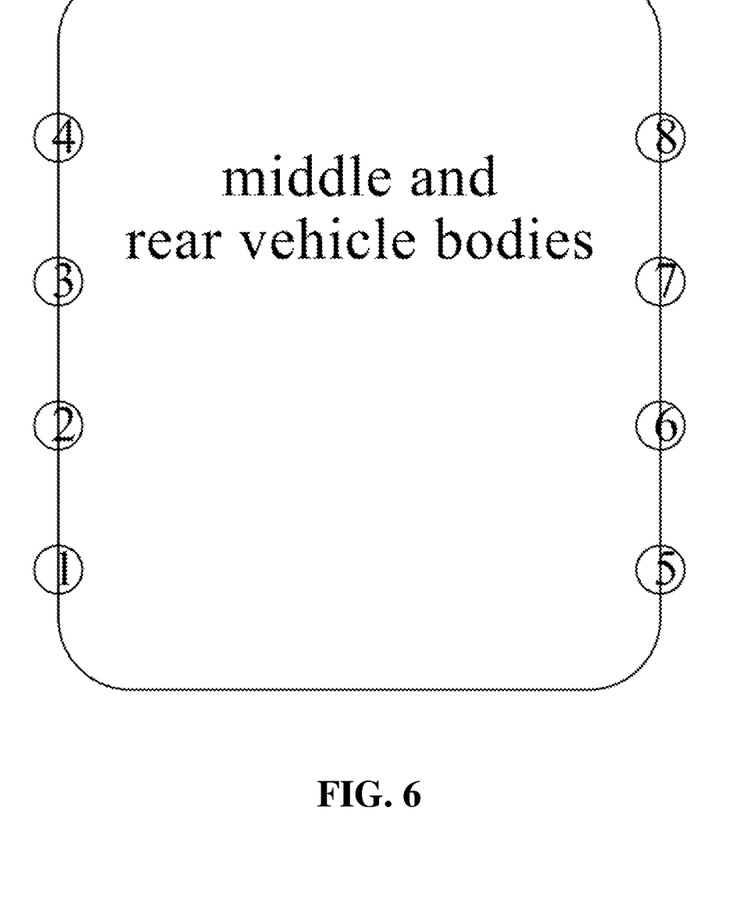
FIG. 6 is a schematic view showing the arrangement of the ultrasonic radars at both sides of a vehicle body according to one embodiment of the present disclosure.

More specifically, the plurality of ultrasonic radars is arranged at both sides of a middle vehicle body and the rear vehicle body. As shown in FIG. 6, the first, second, third and fourth ultrasonic radars are arranged a left side of the vehicle body, and the fifth, sixth, seventh and eighth ultrasonic radars are arranged at a right side of the vehicle body. The quantity of ultrasonic radars arranged at the two sides depends on a search angle of each ultrasonic radar and a length of the vehicle body to be detected. In a word, the ultrasonic radars need to be arranged in such a manner as to detect the region in a gapless manner, and a specific arrangement mode thereof will not be particularly defined herein.

The ultrasonic radars at a read left dead zone and a read right dead zone may be activated when the speed is smaller than a predetermined value. For example, when the speed is smaller than 15 km/h, data acquired by the ultrasonic radars may be adopted by the decision-making system, otherwise, the data may not be adopted by the decision-making system. The active speed range may be set according to the practical need. The accuracy of the ultrasonic radar is deteriorated in the case of a high speed. It may make sense when the obstacle is detected within a short range in such scenarios as a turning, a crossroad, a narrow road or a downtown area, and usually the speed of the vehicle is not too high in these scenarios.

The ultrasonic radars at the read left dead zone and the read right dead zone may be activated when the vehicle is turning, so as to reduce the probability of braking the vehicle erroneously. When the vehicle turns to the left, the ultrasonic radar at the read left dead zone may be activated, and when the vehicle turns to the right, the ultrasonic radar at the read right dead zone may be activated. Whether the vehicle turns to the left or right may be determined in accordance with the steering angle of the steering wheel. For example, when the steering wheel turns to the left by an angle greater than 90°, it may be determined that the vehicle turns to the left, and when the steering wheel turns to the right by an angle greater than 90°, it may be determined that the vehicle turns to the right. The value of the steering angle may also be set according to the practical need.

The safe distance for the ultrasonic radar may be in direct proportion to the speed of the vehicle, or it may be a constant. For example, the safe distance may be set as 0.5 m. At this time, when the vehicle is turning, the speed is smaller than 15 km/h and there is the obstacle within the range of 0.5 m, the decision-making system may transmit the decelerating or braking instruction to the execution system.

In a possible embodiment of the present disclosure, the method further includes: providing a plurality of ultrasonic radars at a rear side of the target commercial vehicle, the ultrasonic radars being configured to detect a region behind the target commercial vehicle in a gapless manner; acquiring information about a gear position of the target commercial vehicle in real time, acquiring a speed of the target commercial vehicle in real time when the target commercial vehicle is reversing, and transmitting the decelerating or braking instruction to the execution system of the target commercial vehicle when the speed is greater than a predetermined speed; and detecting whether there is an obstacle at a rear dead zone within the safe distance, and when there is the obstacle within the safe distance, transmitting the decelerating or braking instruction to the execution system of the target commercial vehicle.

Figure 7:
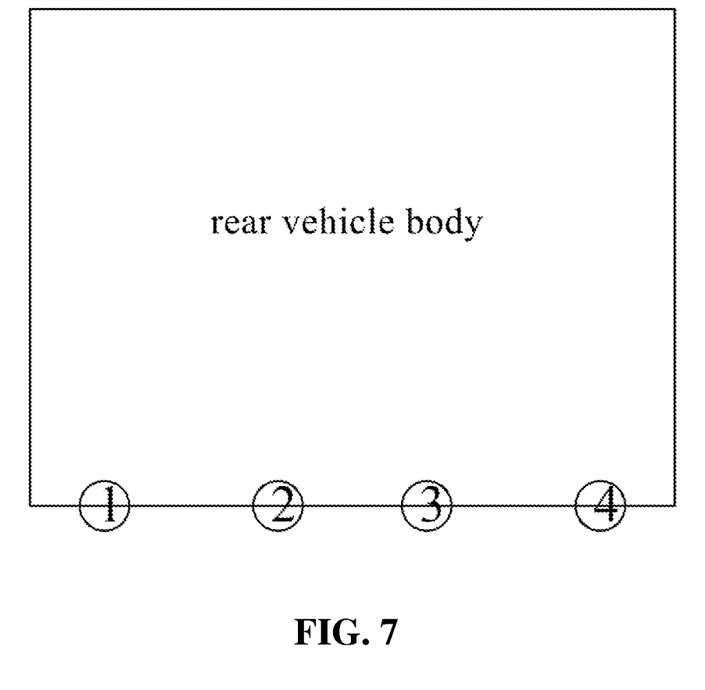
FIG. 7 is a schematic view showing the arrangement of the ultrasonic radars at a rear side of the vehicle according to one embodiment of the present disclosure.

To be specific, the plurality of ultrasonic radars may be arranged at the rear side of the vehicle body, as shown in FIG. 7. The quantity of ultrasonic radars at the rear dead zone depends on a search angle of each ultrasonic radar and the width of the vehicle body. In a word, the ultrasonic radars may be arranged in such a manner as to detect the region in a gapless manner, and an arrangement mode thereof will not be particularly defined herein. The ultrasonic radar at the rear dead zone may be activated when the vehicle is reversing; otherwise, the ultrasonic radar may not be activated. Whether the vehicle is reversing may be determined in accordance with the information about the gear position. The decision-making system may transmit the decelerating or braking instruction to the execution system when one of the following two conditions has been met.

In a first condition, when the speed of the vehicle reaches a predetermined value, e.g., when the speed of the vehicle is greater than 5 km/h when reversing, the vehicle may be decelerated or braked automatically. The predetermined value may be set according to the practical need.

In a second condition, when there is the obstacle within the safe distance for the ultrasonic radar in the rear dead zone, the vehicle may be decelerated or braked automatically. The safe distance may be a constant, e.g., 0.5 m. Of course, the value of the safe distance may be set according to the practical need.

In a possible embodiment of the present disclosure, the method further includes providing a binocular stereo camera and a millimeter-wave radar at a front side of the target commercial vehicle, detecting whether there is an obstacle before the target commercial vehicle within a medium or long distance through the binocular stereo camera or the millimeter-wave radar, and when there is the obstacle within the medium or long distance, transmitting the decelerating or braking instruction to the execution system of the target commercial vehicle in accordance with a predetermined braking strategy.

The system for braking the commercial vehicle in the embodiments of the present disclosure also needs to perform the detection and make a decision with respect to an obstacle within the medium or long distance. To be specific, information about the obstacle within the medium or long distance may be acquired through the binocular stereo camera and the millimeter-wave radar. Usually, the binocular stereo camera and the millimeter-wave radar are arranged at the front side of the vehicle body, so as to detect the obstacle within the medium or long distance, and generate the decelerating or braking instruction, thereby to decelerate or brake the vehicle when one of the following two triggering conditions has been met.

A first triggering condition is a Time-To-Collision (TTC), which may be expressed as $T=S/\Delta V$ (2), where S represents a distance between the vehicle and an obstacle closest to the vehicle on a driving trajectory, and $\Delta V$ represents a relative speed of the vehicle relative to the obstacle. When the TTC is smaller than one of predetermined thresholds (usually within a range of 0.5 s to 1.5 s), the system may transmit different instructions corresponding to alarm, strong alarm, braking at a small force and braking at a large force to the execution system.

A second triggering condition is whether there is an obstacle within the safe distance. When there is the obstacle, the system may transmit different instructions corresponding to alarm, strong alarm, braking at a small force and braking at a large force to the execution system in accordance with distances between the obstacle and the vehicle. The safe distance may be associated with the speed of the vehicle, and it may be expressed as $S=f \times V$ (3), where f is a constant and it is merely related to the vehicle body, and V represents the speed of the vehicle. Based on the above equation, the larger the speed, the larger the safe distance to be provided.

Figure 8:
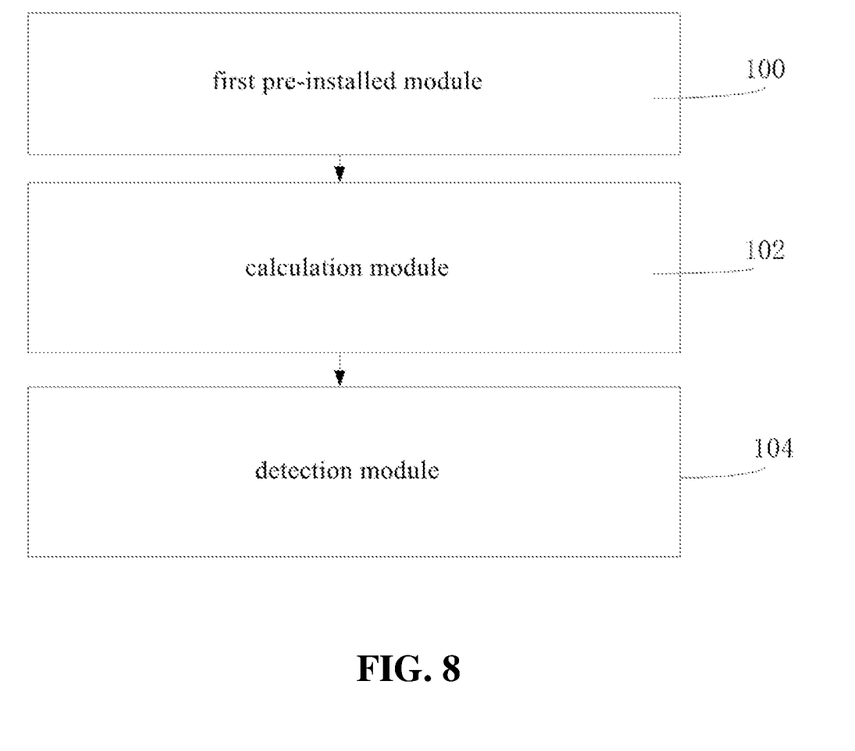
FIG. 8 is a schematic view showing a device for automatically braking a commercial vehicle according to one embodiment of the present disclosure.

The present disclosure further provides in some embodiments a device for automatically braking a commercial vehicle which, as shown in FIG. 8, includes: a first pre-installed module 100 including a plurality of ultrasonic radars arranged on a front vehicle body of a target commercial vehicle and configured to detect a region before the target commercial vehicle in a gapless manner, an active speed range being set for each ultrasonic radar; a calculation module 102 configured to acquire a current speed of the target commercial vehicle in real time and calculate a safe distance for each ultrasonic radar in accordance with the current speed; and a detection module 104 configured to detect whether there is an obstacle within the safe distance in real time, and when there is the obstacle within the safe distance, transmit a decelerating or braking instruction to an execution system of the target commercial vehicle.

In a possible embodiment of the present disclosure, the calculation module 102 includes: a definition module configured to define an angle between a line connecting an origin and an $n^{th}$ ultrasonic radar and a driving direction as $\alpha_n$; a judgment module configured to judge whether $|\alpha_n|$ is smaller than or equal to 90°, and when $|\alpha_n|$ is smaller than or equal to 90°, calculate the safe distance in real time through $S_n = V \times \cos(|\alpha_n|) \times P_1 + P_2$ (1); and a first determination module configured to, when $|\alpha_n| > 90°$, determine that the safe distance $S_n$ is 0, where $S_n$ represents a dynamic safe distance for the $n^{th}$ ultrasonic radar, n represents a serial number of the ultrasonic radar, V represents a current speed, $P_1$ and $P_2$ are constants.

In a possible embodiment of the present disclosure, the device further includes: a second pre-installed module (not shown) including a plurality of ultrasonic radars arranged at both sides of a rear vehicle body of the target commercial vehicle and configured to detect regions at both sides of the rear vehicle body of the target commercial vehicle in a gapless manner, a first active speed threshold being set for each ultrasonic radar; a second determination module (not shown) configured to acquire a steering angle of a steering wheel of the target commercial vehicle in real time, and when the steering wheel turns to left or right by 90°, determine that the commercial vehicle is turning to the left or right; and a transmission module (not shown) configured to activate the ultrasonic radars at a corresponding side to detect whether there is an obstacle within the safe distance, and when there is the obstacle within the safe distance, transmit the decelerating or braking instruction to the execution system of the target commercial vehicle.

In a possible embodiment of the present disclosure, the device further includes: a third pre-installed module (not shown) including a plurality of ultrasonic radars arranged at a rear side of the target commercial vehicle and configured to detect a region behind the target commercial vehicle in a gapless manner; a third determination module (not shown) configured to acquire information about a gear position of the target commercial vehicle in real time, acquire a speed of the target commercial vehicle in real time when the target commercial vehicle is reversing, and transmit the decelerating or braking instruction to the execution system of the target commercial vehicle when the speed is greater than a predetermined speed; and a fourth determination module (not shown) configured to detect whether there is an obstacle at a rear dead zone within the safe distance, and when there is the obstacle within the safe distance, transmit the decelerating or braking instruction to the execution system of the target commercial vehicle.

The present disclosure further provides in some embodiments a system for automatically braking a commercial vehicle, which includes the above-mentioned device.

To be specific, the system may include a sensing and decision-making module for a medium or long distance, a sensing and decision-making module for the front left dead zone, the front right dead zone and the front dead zone, a sensing and decision-making module for the rear left dead zone and the rear right dead zone, and a sensing and decision-making module for the rear dead zone. Through the cooperation of these modules, it is able to detect the obstacles in an all-around manner at any speed and in any scenario, thereby to prevent the occurrence of traffic accidents for the commercial vehicle.

According to the embodiments of the present disclosure, the system for automatically braking the commercial vehicle uses an algorithm, and includes the binocular stereo camera, the millimeter-wave radar, the ultrasonic radars, a strategy control system, a braking execution system, a man-machine interaction screen and relevant circuits. When there is the obstacle that probably collides with the vehicle, the system may automatically give an alarm or automatically brake the vehicle, so as to prevent or remarkably reduce the occurrence of traffic accidents caused when a driver is in a fatigue state, dozing, being distracted, or chatting, thereby to improve the driving safety.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for automatically braking a target commercial vehicle, comprising:
providing a plurality of ultrasonic radars on a front vehicle body of the target commercial vehicle, the ultrasonic radars being configured to detect a region before the target commercial vehicle in a gapless manner, an active speed range being set for each ultrasonic radar;
acquiring a current speed of the target commercial vehicle in real time and calculating a safe distance for each ultrasonic radar in accordance with the current speed; and
detecting whether there is an obstacle within the safe distance in real time, and when there is the obstacle within the safe distance, transmitting a decelerating or braking instruction to an execution system of the target commercial vehicle,
wherein the step of acquiring comprises: defining an angle between a line connecting an origin and an $n^{th}$ ultrasonic radar and a driving direction $\alpha_n$; judging whether $|\alpha_n|$ is smaller than or equal to 90°, and when $|\alpha_n|$ is smaller than or equal to 90°, calculating the safe distance in real time through $S_n=V\times\cos(|\alpha_n|)\times P_1+P_2$; and when $|\alpha_n|>90°$, determining that the safe distance $S_n$ is 0, where $S_n$ represents a dynamic safe distance for the $n^{th}$ ultrasonic radar, n represents a serial number of the ultrasonic radar, V represents a current speed, $P_1$ and $P_2$ are constants.

2. The method according to claim 1, further comprising:
providing a plurality of ultrasonic radars at both sides of a rear vehicle body of the target commercial vehicle, the ultrasonic radars being configured to detect regions at both sides of the rear vehicle body of the target commercial vehicle in a gapless manner, a first active speed threshold being set for each ultrasonic radar;
acquiring a steering angle of a steering wheel of the target commercial vehicle in real time, and when the steering wheel turns to left or right by 90°, determining that the commercial vehicle is turning to left or right; and
activating the ultrasonic radars at a corresponding side to detect whether there is an obstacle within the safe distance, and when there is the obstacle within the safe distance, transmitting the decelerating or braking instruction to the execution system of the target commercial vehicle.

3. The method according to claim 2, further comprising:
providing a plurality of ultrasonic radars at a rear side of the target commercial vehicle, the ultrasonic radars being configured to detect a region behind the target commercial vehicle in a gapless manner;
acquiring information about a gear position of the target commercial vehicle in real time, acquiring a speed of the target commercial vehicle in real time when the target commercial vehicle is reversing, and transmitting the decelerating or braking instruction to the execution system of the target commercial vehicle when the speed is greater than a predetermined speed; and
detecting whether there is an obstacle at a rear dead zone within the safe distance, and when there is the obstacle within the safe distance, transmitting the decelerating or braking instruction to the execution system of the target commercial vehicle.

4. The method according to claim 2, further comprising providing a binocular stereo camera and a millimeter-wave radar at a front side of the target commercial vehicle, detecting whether there is an obstacle in the front side of the target commercial vehicle within a medium or long distance through the binocular stereo camera or the millimeter-wave radar, and when the obstacle is within the medium or long distance, transmitting the decelerating or braking instruction to the execution system of the target commercial vehicle in accordance with a predetermined braking strategy.

* * * * *